United States Patent
Ayyagari et al.

(10) Patent No.: US 11,729,623 B2
(45) Date of Patent: Aug. 15, 2023

(54) PAIRING A MOBILE COMPUTER TO A PERIPHERAL WIRELESS DEVICE DURING SETUP PROCEDURES

(71) Applicant: ZEBRA TECHNOLOGIES CORPORATION, Lincolnshire, IL (US)

(72) Inventors: Deepak Ayyagari, Bangalore (IN); Vikas N. Channappagoudra, Ron (IN); Dikshith Anchan, Bangalore (IN); Paul Hedley, Bancroft (CA); Siva Nagendra Konakalla, Bangalore (IN); Sandeep Hattiholi, Bengaluru (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 203 days.

(21) Appl. No.: 17/365,597

(22) Filed: Jul. 1, 2021

(65) Prior Publication Data

US 2023/0007492 A1 Jan. 5, 2023

(51) Int. Cl.
*H04W 12/50* (2021.01)
*H04W 12/06* (2021.01)
*G06F 13/42* (2006.01)
*G06F 13/38* (2006.01)
*H04W 4/80* (2018.01)

(52) U.S. Cl.
CPC .......... *H04W 12/50* (2021.01); *G06F 13/385* (2013.01); *G06F 13/4282* (2013.01); *H04W 4/80* (2018.02); *H04W 12/06* (2013.01); *G06F 2213/3814* (2013.01)

(58) Field of Classification Search
CPC ....... H04W 4/80; H04W 12/06; G06F 13/385; G06F 13/4282
See application file for complete search history.

(56) References Cited

U.S. PATENT DOCUMENTS

| | | | |
|---|---|---|---|
| 9,730,257 B2 * | 8/2017 | Kwon | H04W 4/80 |
| 2016/0366542 A1 | 12/2016 | Brown et al. | |
| 2017/0367124 A1 | 12/2017 | Bhella et al. | |
| 2022/0070640 A1 | 3/2022 | Wimalasena et al. | |

OTHER PUBLICATIONS

International Search Report and Written Opinion for International Application No. PCT/US2022/35065 dated Sep. 21, 2022.

* cited by examiner

*Primary Examiner* — Curtis B Odom

(57) ABSTRACT

A method of pairing a mobile computing device with an external device during set up of the mobile computing device, the method comprising, at a computing device initiate a setup application for the mobile computing device; determining if the mobile computing device has an internal scanner; when the mobile computing device does not have an internal scanner: prepare the mobile computing device for pairing with a peripheral scanning device; prepare the peripheral scanning device for pairing with the mobile computing device; pairing the mobile computing device with the peripheral scanning device; and scanning staging indicia with the peripheral scanning device to initiate a device staging application within the mobile computing device.

18 Claims, 10 Drawing Sheets

PAIRING A MOBILE COMPUTER TO A PERIPHERAL WIRELESS DEVICE DURING SETUP PROCEDURES

BACKGROUND

Staging of a mobile computing device may require imaging indicia provided with the mobile computing device. This may cause issues however if the mobile computing device does not come with an integrated imager and needs to be paired with an external scanning device. The mobile computing device, at this point in setup, would not have full capabilities which would typically be available during pairing. The challenge comes in developing a solution that allows pairing to occur between a mobile computing device and an external scanning device when the typical capabilities are not available.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
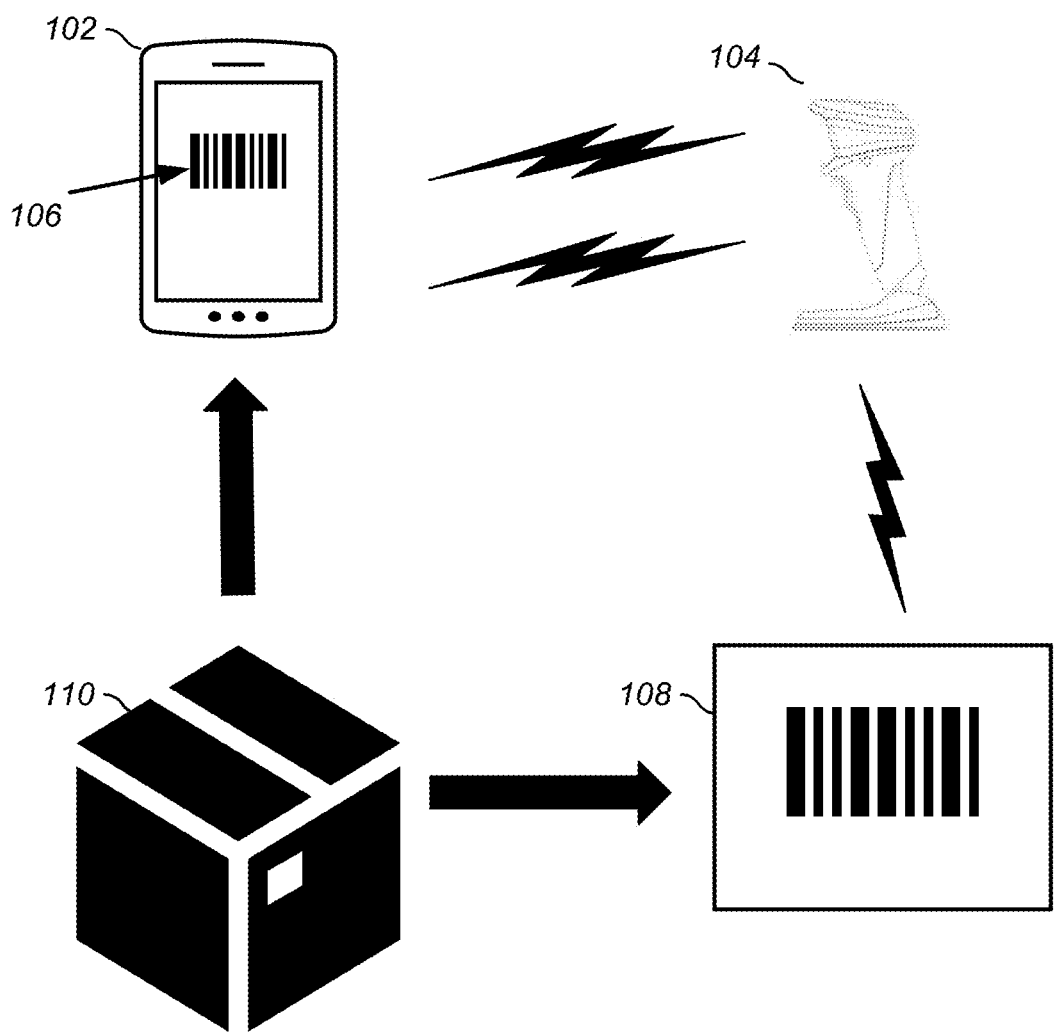
FIG. 1 is a schematic diagram of a system for mobile computing device staging.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

When a mobile computing device (MCD) is first removed from the packaging by a new user, the new user may want to configure, or stage, the new MCD with settings similar to other mobile computing devices that the user owns. A new MCD may enter a setup application upon start up, and from the setup application, the user may want to enter a staging application which would set up the MCD.

The process of staging the new MCD similarly to the other MCDs can be done a variety of ways. A common way to stage a new MCD would be to have a staging indicia, in some cases a barcode, come in the packaging with the MCD. The indicia may include data that can be used by the MCD for staging. The indicia could then be imaged or scanned by the MCD, which decodes the data included in the indicia and uses the data for staging.

However, an issue may arise if the MCD does not have an integrated imager or scanner for which to scan the indicia used for staging. In this scenario, the MCD would not be able to scan the indicia provided for staging, which allows the MCD to exit the setup application and enter the staging application. When a MCD does not have an integrated scanner, the user may use a known method for pairing the MCD with a peripheral scanner. However, when the MCD is in the setup application, which the MCD may be in upon start up, the MCD may not be able to exit the setup mode in order to pair with the peripheral scanning device. An issue then arises as to how to pair a MCD without an integrated scanner with a peripheral scanning device while the MCD is executing the setup application.

The MCD may be used in a facility. Prior to deployment in a given facility, each MCD is configured for operation in that facility. That is, the MCD is received at the facility from a device manufacturer in a state that generally includes an operating system but does not include various facility-specific software to enable the MCD to perform the tasks for which the MCD will be deployed in the facility. Preparing each MCD to operate in the relevant facility is referred to as staging the MCD, and includes one or more of the installation of applications, configuration of settings (e.g., network connections), and retrieval of other data to enable the device to operate within the facility.

Various mechanisms may be employed to stage a MCD. For example, when the MCD includes a barcode reader module, a MCD can be operated to scan one or more previously generated barcodes and retrieve therefrom instructions and/or storage locations for staging data. In other examples, a MCD may be operated to establish a connection to another, previously staged MCD, and retrieve staging data therefrom in what is referred to as peer-to-peer (P2P) staging. In further examples, a MCD can be placed into a charging cradle that is connected to a network, and the MCD may then be operated to initiate staging, e.g., by retrieving staging data from a source previously made available via the charging cradle. The above staging mechanisms, however, involve manual operation of each MCD by staging staff, and may therefore be time-consuming and error prone.

The system described below includes certain components and functionality to reduce manual intervention by staging staff, enabling staging of MCD that is automated to a greater degree than in the mechanisms mentioned above.

Examples disclosed herein are directed to a method of pairing a mobile computing device with an external device during set up of the mobile computing device, the method comprising, at a computing device: initiate a setup application for the mobile computing device; determining if the mobile computing device has an internal scanner; when the mobile computing device does not have an internal scanner: prepare the mobile computing device for pairing with a peripheral scanning device; prepare the peripheral scanning device for pairing with the mobile computing device; pairing the mobile computing device with the peripheral scanning device; and scanning staging indicia with the peripheral scanning device to initiate a device staging application within the mobile computing device.

Additional examples disclosed herein are directed to a method of pairing a mobile computing device with a peripheral scanning device, the method comprising: initiating a setup application for the mobile computing device; inputting a touch configuration on a user interface of the mobile computing device; displaying a pairing indicia on the user interface, wherein the pairing indicia contains data corresponding to a Bluetooth MAC address of the mobile computing device; scanning the pairing indicia with the peripheral scanning device; in response to scanning the pairing indicia, using the Bluetooth MAC address of the mobile computing device to pair the mobile computer device with the peripheral scanning device; establishing a Bluetooth connection between the mobile computing device and the peripheral scanning device; and scanning a staging indicia with the peripheral scanning device to initiate a device staging application within the mobile computing device.

Further examples disclosed herein are directed to a method of pairing a mobile computing device with a peripheral scanning device, the method comprising: initiating a setup application for the mobile computing device; inputting a first hardware key sequence on the mobile computing device to activate a Bluetooth radio of the mobile computing device; inputting a second hardware key sequence on the peripheral scanning device to activate a second Bluetooth radio of the peripheral scanning device; writing data into an Extended Inquiry Response for transmission by with the peripheral scanning device; discovering the peripheral scanning device with the mobile computing device via the data within the Extended Inquiry Response; initiating pairing between the mobile computing device and the peripheral scanning device; authenticating the pairing between the mobile computing device and the peripheral scanning device; and scanning a staging indicia with the peripheral scanning device to initiate a device staging application within the mobile computing device.

Further examples disclosed herein are directed to a method of pairing a NFC enabled mobile computing device with a peripheral scanning device, the method comprising: initiating a setup application for the mobile computing device; tapping the peripheral scanning device against the mobile computing device; exchanging Bluetooth data between the mobile computing device and the peripheral scanning device; initiating pairing between the mobile computing device and the peripheral scanning device; authenticating the pairing between the mobile computing device and the peripheral scanning device; and scanning a staging indicia with the peripheral scanning device to initiate a device staging application within the mobile computing device.

FIG. 1 depicts a system 100 including a mobile computing device (MCD) 102 and a peripheral scanning device 104. The MCD 102 can include any one of, or any combination of, handheld or wearable computers, smartphones, tablet computers, or the like. Each MCD 102 thus includes a variety of internal components (e.g., controllers, displays, processors, or the like), powered by an integrated battery. Components within the MCD 102 will be further described below. The MCD in the depicted example do not have an integrated scanner. The MCD 102 may require configuration upon set up of the MCD 102, for example, when it is first removed from the MCD packaging 110.

Some MCD 102 are able to configure a device by scanning a staging indicia 108 that comes with the MCD 102 in the packaging 110. In this scenario, when the MCD 102 scans the staging indicia 108, the MCD 102 decodes data encoded in the staging indicia 108 and executes a staging application which stages the device. However, if MCD 102 does not have an integrated scanner allowing the MCD 102 to scan the staging indicia 108, then other steps need to be taken to allow the staging indicia 108 to be scanned. In some scenarios, MCD 102 may pair with a peripheral scanning device (PSD) 104. The PSD 104 will be described in greater detail below. The pairing can be done via Bluetooth or other similar wireless pairing methods. Methods of pairing the MCD 102 with the PSD 104 are described further below. One method of pairing includes the MCD 102 displaying a pairing indicia 106 on a user interface of the MCD 102 and using the PSD 104 to scan the pairing indicia 106 to being the pairing process.

Once the MCD 102 is paired with the PSD 104, the PSD 104 is able to scan indicia and transmit the data within the indicia via wireless connection to the MCD 102. The PSD 104 may scan the staging indicia 108 at this time and transmit the data within the staging indicia 108 to the MCD 102. The MCD 102 can then use that data to execute the staging application.

Figure 2:
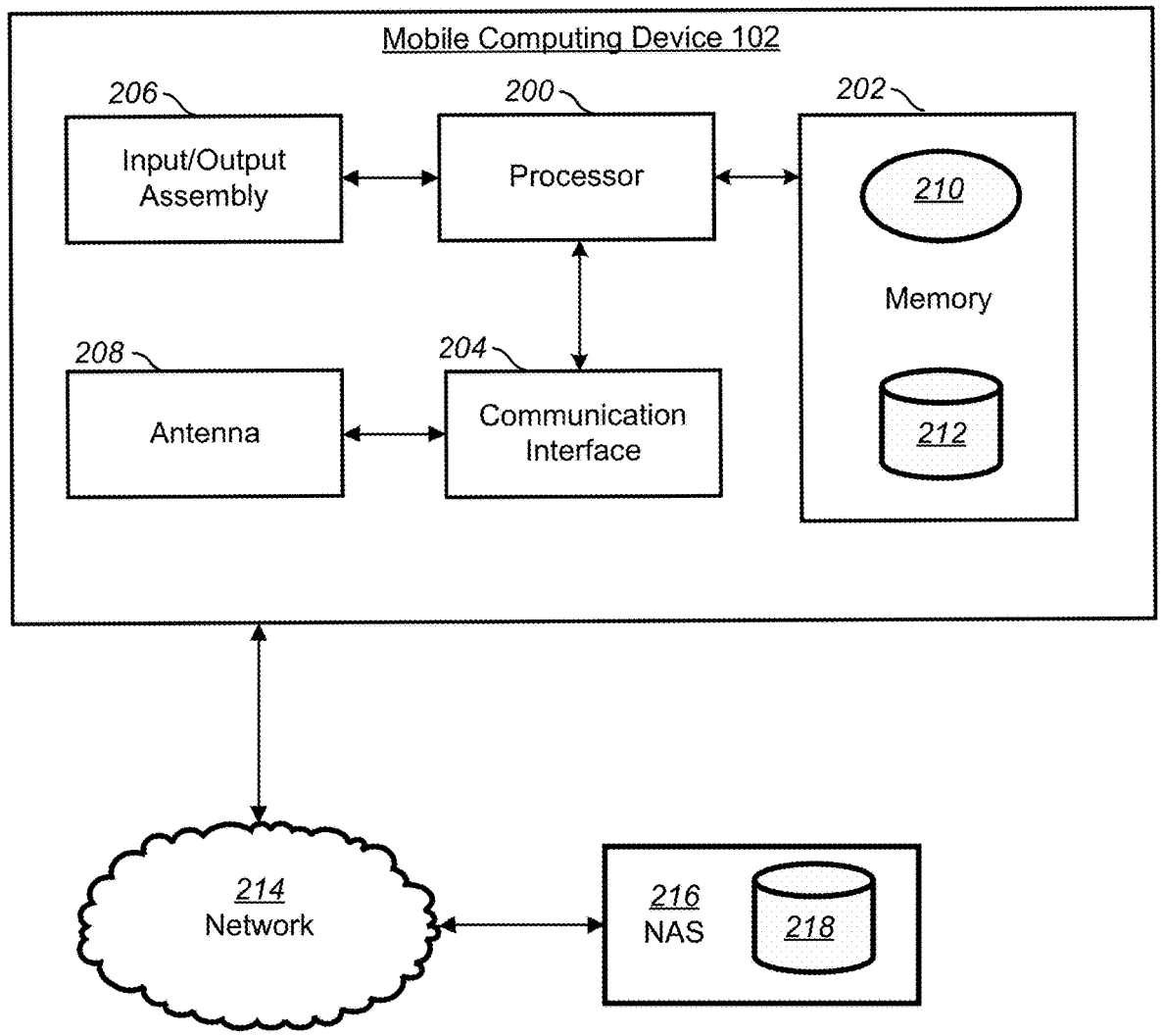
FIG. 2 is a block diagram of certain internal hardware components of a mobile computing device of FIG. 1.

FIG. 2 depicts internal components of a MCD 102. The MCD 102 includes a central processing unit (CPU), also referred to as a processor 200, interconnected with a non-transitory computer readable storage medium, such as a memory 202. The memory 202 includes any suitable combination of volatile (e.g., Random Access Memory (RAM)) and non-volatile (e.g. read only memory (ROM), Electrically Erasable Programmable Read Only Memory (EEPROM), flash) memory. The processor 200 and the memory 202 each comprise one or more integrated circuits (ICs).

The memory 202 stores a plurality of computer-readable instructions 210, e.g., in the form of a staging control application and a pairing application. The applications are executable by the processor 200 to implement various functionality performed by the MCD 102. As will be discussed below, the staging control application implements functionality to detect new MCD 102 settings to be staged, and to select a source of staging data for such devices. The staging data includes, for example, one or more staging files that contain applications, configuration settings, and the like, and/or instructions for where to retrieve such information. The memory 202 stores, in this example, a repository 212 of staging data. The MCD 102, however, may not be the only source of staging data in the system 100. In fact, in some examples, the MCD 102 may not host any staging data.

Another example of staging data source is a network-attached storage (NAS) device 216 containing a copy 218 of the staging data, in communication with the MCD 102 via network 214.

The MCD 102, having selected a source of staging data, is configured via execution of the staging application 210 to control access to either or both of the source, and the MCD 102 being staged.

The MCD 102 also includes at least one input device, and at least one output device, illustrated in FIG. 2 as an input/output assembly 206 (otherwise called user interface) interconnected with the processor 200. In the present example, the input/output assembly is a touch-enabled display (i.e., a display panel with an integrated touch screen). In other examples, the input and output devices need not be integrated as shown in FIG. 2. The input device includes any suitable one, or any suitable combination of, a touch screen, a keypad, a trigger (e.g., to initiate the performance of an encoding or scanning task), a microphone and the like. The output device includes any suitable one, or any suitable combination of a display (e.g., integrated with the above-mentioned touch screen), a speaker, and the like. The input/output device 206 is configured to receive input and provide data representative of the received input to the processor 200, and to receive output from the processor 200 and present the output, e.g., via the emission of sound from the speaker, the rendering of visual indications on the display, and the like.

The MCD 102 also includes a communications interface 204, enabling the MCD 102 to exchange data with other computing devices, such as the PSD 104 or the NAS 216 via the network 214. The communications interface 204 therefore includes any suitable hardware (e.g., antenna 208, transmitters, receivers, network interface controllers and the like) allowing the MCD 102 to communicate.

The components of the MCD 102 are interconnected by communication buses, and powered by a battery or other power source, over the above-mentioned communication buses or by distinct power buses. In other examples, the processor 200, as configured by the execution of the application 210, is implemented as one or more specifically configured hardware elements, such as field-programmable gate arrays (FPGAs) and/or application-specific integrated circuits (ASICs).

Figure 3:
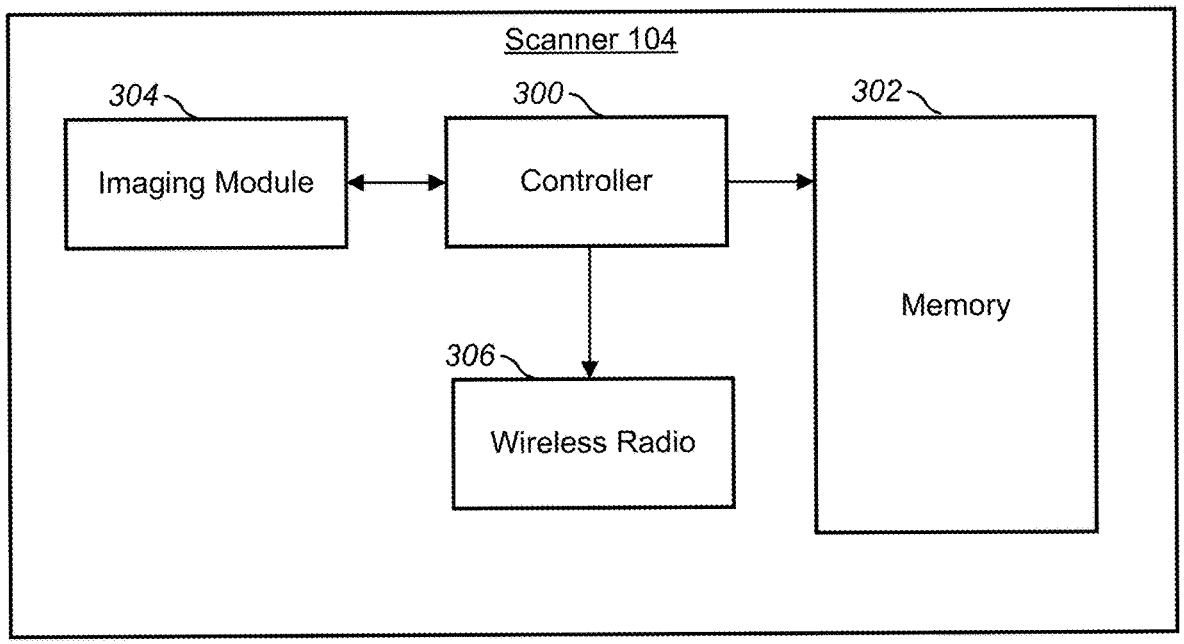
FIG. 3 is a block diagram of certain internal hardware components of a peripheral scanning device of FIG. 1.

Turning now to FIG. 3, the scanner 104 is comprised of an imaging module 304, a controller 300, memory 302, and a wireless radio 306. Each of these components can be connected to each other component via a communication bus and/or directly as required by the hardware architecture. In particular, the controller 300 can be configured to control various elements of the scanner 104 like the imaging module 112 and wireless radio 118 in response to some type of a trigger.

Figure 4:
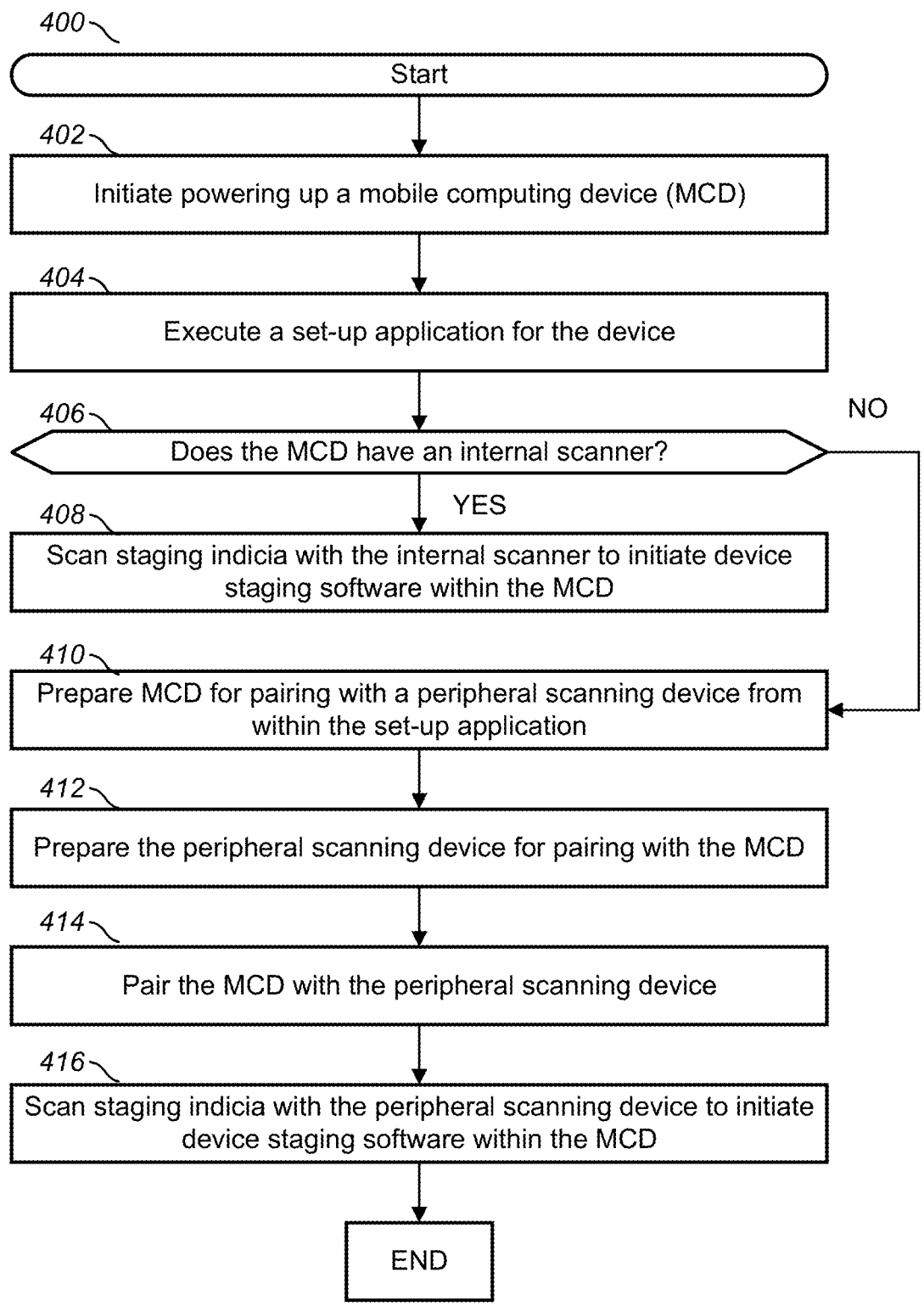
FIG. 4 is a flowchart of a method of initiating staging software in a mobile computing device without an imager in the system of FIG. 1.

Turning now to FIG. 4, a method 400 of staging a mobile computing device is illustrated. The method 400 will be described in conjunction with its performance in the system 100. More specifically, certain portions of the method 400 as described below are performed between MCD 102 that has not yet been staged, and the peripheral scanning device 104.

At block 402, the mobile computing device 102 is powered up. This may be done immediately after removal from the packaging 110. In some embodiments, the MCD 102 is being powered up for the first time by the user.

At block 404, a setup application within the MCD 102 is executed. The setup application is an application that allows the initial settings of the MCD 102 to be configured. The setup application may be a setup wizard, or some other type of software that is configured to allow a MCD to go from start up to use. In some embodiments, as the setup application runs, other features of the MCD cannot be used. This may include features such as pairing the MCD with other devices or other types of communication procedures.

At block 406, a determination is made into if the MCD 102 contains an internal scanner. In other words, the process of staging the MCD 102 will be different if the MCD has a scanner in the MCD housing that can be used or not. If the MCD 102 contains an internal scanner, then the method moves to block 408. If the MCD 102 does not have an internal scanner, the method goes to block 410.

At block 408, the MCD 102 is capable of scanning staging indicia 108 with the internal scanner to initiate the devices staging software within the MCD. Once the MCD scans the staging indicia 108, the MCD 102 executes the staging application and properly configures settings.

At block 410, if the MCD 102 does not have an internal scanner, then the MCD prepares for pairing with a peripheral scanning device from within the setup application. Different methods for pairing are described in greater detail below.

At block 412, the PSD 104 prepares for pairing with the MCD 102. In some embodiments, the PSD 104 is prepared by activating the wireless radio 306 of the PSD 104 and preparing to transmit. In another embodiment, a Near-Field Communication (NFC) sensor of the PSD 104 communicates with the MCD 102 and executes a Bluetooth connection. The NFC sensor communicates through a tapping motion which initiates a Bluetooth pairing application to initiate the Bluetooth pairing process. Once the Bluetooth peripheral is paired, the peripheral becomes an input source for the staging application.

At block 414, the MCD 102 pairs with the PSD 104. The pairing may be a Bluetooth connection or a similar type of pairing that allows wireless data transfer between the MCD 102 and the PSD 104.

At block 416, the PSD 104 scans the staging indicia and transfer the data from the staging indicia to the MCD 102. In the described embodiment, the MCD 102 then executes the staging application and begins the staging process as described above. Once the MCD 102 has been staged, the MCD 102 can begin normal operation by the user.

The method of FIG. 4 can be done in a variety of ways. As described above, once the MCD 102 begins executing the setup application, typically the MCD 102 will not be able to complete separate tasks while the setup application is running. This issue arises in FIG. 4 for boxes 410-416. Alternative methods of establishing a connection are described below.

Figure 5:
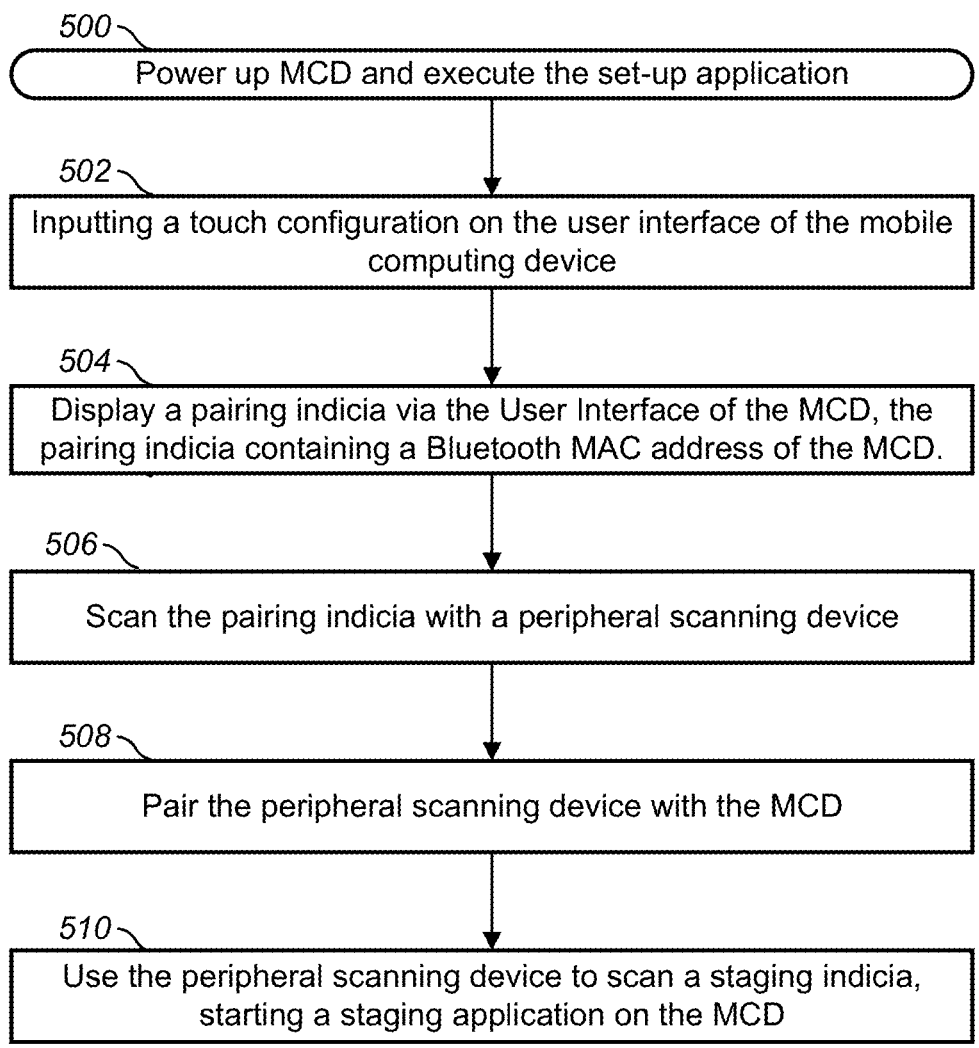
FIG. 5 is a flowchart of a first method for pairing an imager-less mobile computing device with a peripheral scanning device of FIG. 4.

FIG. 5 depicts an alternative method for scanning staging indicia with MCD 102. The method as depicted in FIG. 5 can be used with the system 100 as shown in FIG. 1. At block 500, the MCD 102 is powered up and executes the setup application. As described above, once in the setup application, often times other functions of the MCD 102 are not available, which requires separate solutions to pair with the PSD 104.

At block 502, the user inputs a touch configuration on the user interface 206 of the MCD 102. The touch configuration can be any combination of a plurality of touches to the user interface 206 that are specialized to a point that enables the MCD 102 to recognize the specialized touches as an input to enable programming. The touch configuration can be taps, swipes, or any combination thereof that the user can input.

At block 504, the user interface 206 displays a pairing indicia 106. The pairing indicia 106 is coded with pairing data comprising a Bluetooth MAC address of the MCD 102. The pairing data is any data that can be used by the scanner 104 to initiate pairing with the MCD 102. The MCD 102 encodes the Bluetooth MAC address into a barcode (shown as pairing indicia 106 in FIG. 1). The barcode can be a one-dimensional barcode (e.g., UPC, code 39, code 128, EAN-13, etc.) or a two-dimensional barcode (e.g., QR code, PDF147, Data Matrix, GS1, etc.). In preferred embodiments, the barcode is a parameter-setting barcode that includes the Bluetooth MAC address along with a trigger indicator configured to signal to the scanner 104 that certain parameters within the scanner must be changed (e.g., the scanner is to pair for an external device).

At block 506, the scanner 104 scans the pairing indicia 106 using the imaging module 304. The scanner 104 decodes the pairing indicia and searches for the MCD 102 by searching for a device matching the Bluetooth MAC address that was encoded in the pairing indicia 106.

At block 508, the scanner 104 and the MCD 102 begin a pairing process. Upon detecting the MCD 102 advertising the Bluetooth MAC address, in block 506, the MCD 102 and the scanner 104 initiate a pairing process which, when successful, establishes a bi-directional wireless communication link between the scanner 104 and the MCD 102. Once established, this link can enable the scanner to transmit data to the MCD for, for example, database storage, further uplink transmission, analysis, scanning, and so on. Additionally, the MCD 102 may further configure the scanner 104 based on certain preset settings. It should be appreciated that additional security measures can be built into the pairing process whereby acknowledgement(s) and/or passcode(s) may be required at either end of the communication link. A method for further securing the connection will be described below.

At block 510, after the scanner 104 and the MCD 102 have paired, the user uses the scanner 104 to scan the staging indicia 108. Once the staging indicia is scanned, the scanner 104 transmits the staging data from the staging indicia 108. The MCD 102 then uses the staging data to execute the staging application from within the setup application.

Figure 6:
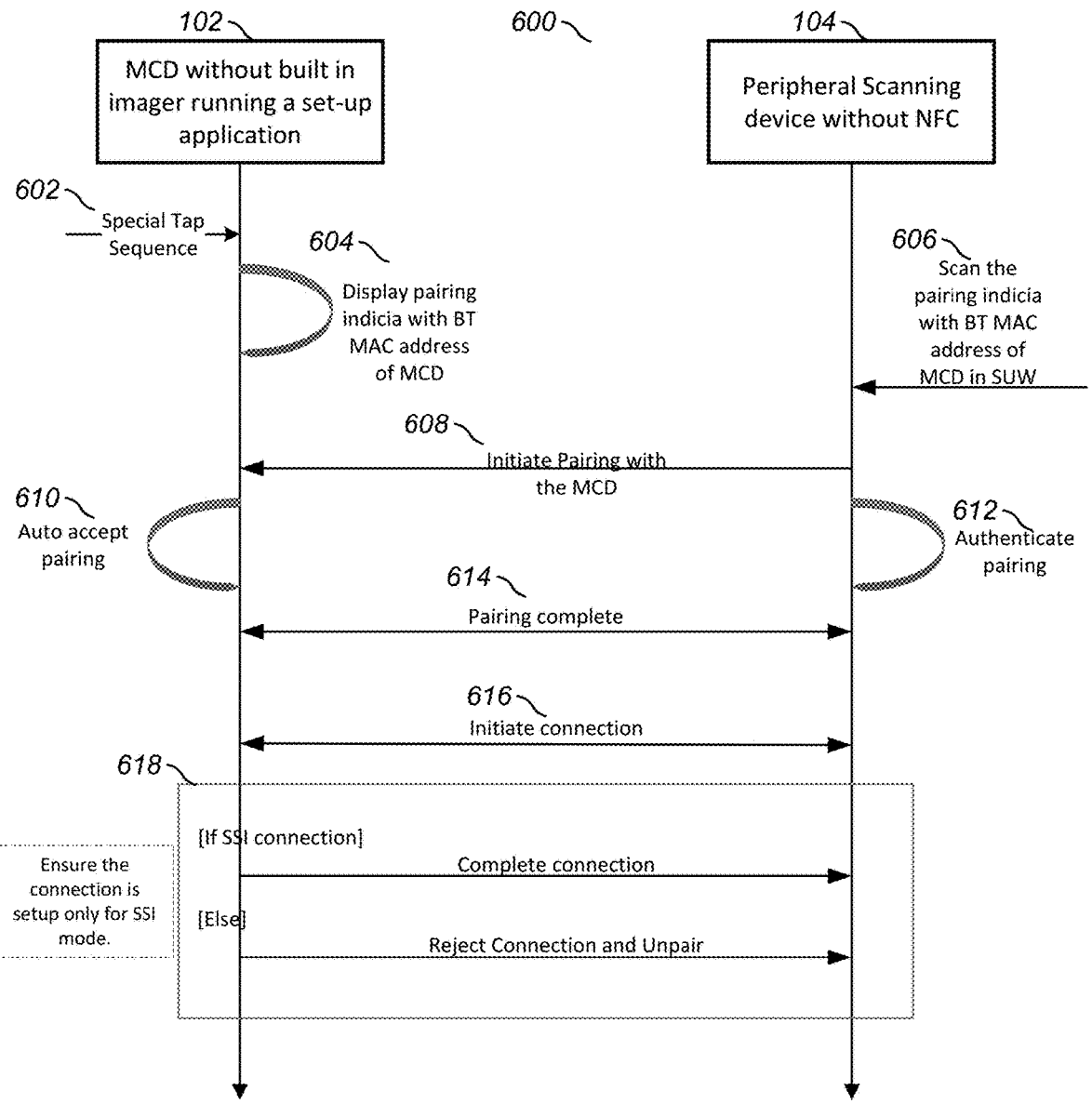
FIG. 6 is a sequence diagram showing the relationship of the imager-less mobile computing device and the peripheral scanning device during the method of FIG. 5.

FIG. 6 depicts a sequence diagram 600 of the method described in FIG. 5. The sequence diagram 600 has the processes by the MCD 102 on the left-hand side and the processes by the PSD 104 on the right hand side. The sequence diagram 600 begins with the MCD 102 having step 602 which requires a special tap sequence to be input into the MCD 102. From the special tap sequence, the MCD 102 moves to step 604 and displays pairing indicia with an encoded Bluetooth MAC address representative of the MCD 102. For step 606, the PSD 104 scans the pairing indicia displayed on the MCD 102. For step 608, the PSD 104 initiates pairing with the MCD 102.

As to step 610 is done after the PSD 104 initiates pairing with the MCD 102, the MCD 102 auto accepts the pairing from the PSD 104. As to step As to step 612, the PSD 104, after initiating pairing with the MCD 102, authenticates the pairing. After the MCD 102 accepts the pairing in step 610 and then PSD 104 authenticates the pairing of 612, the pairing is completed in step 614. After the Bluetooth pairing is complete, a Bluetooth connection is formed between the MCD 102 and the PSD 104 at step 616. The connection allows for transmissions between the MCD 102 and PSD 104 at a first basic security level. The first basic security level being security that is known in the art for Bluetooth connections.

For step 618, further security checks occur to make sure that the PSD 104 and the MCD 102 are intended to be paired and that the PSD 104 is not a rogue device where the user is not in control. Rogue devices may be a security threat as they can simulate a safe device until a connection is made and then the rogue device can corrupt the user's system. Step 618 allows the MCD 102 to ensure that the connection is set up only for Synchronous Serial Interface (SSI) protocol to complete the connection setup. If the connection is not for SSI protocol, then the MCD 102 rejects the connection and unpairs the PSD 104. The SSI protocol limits the connection to scanners configured to use the SSI mode, as opposed to other connection types like Human Interface Device (HID).

Figure 7:
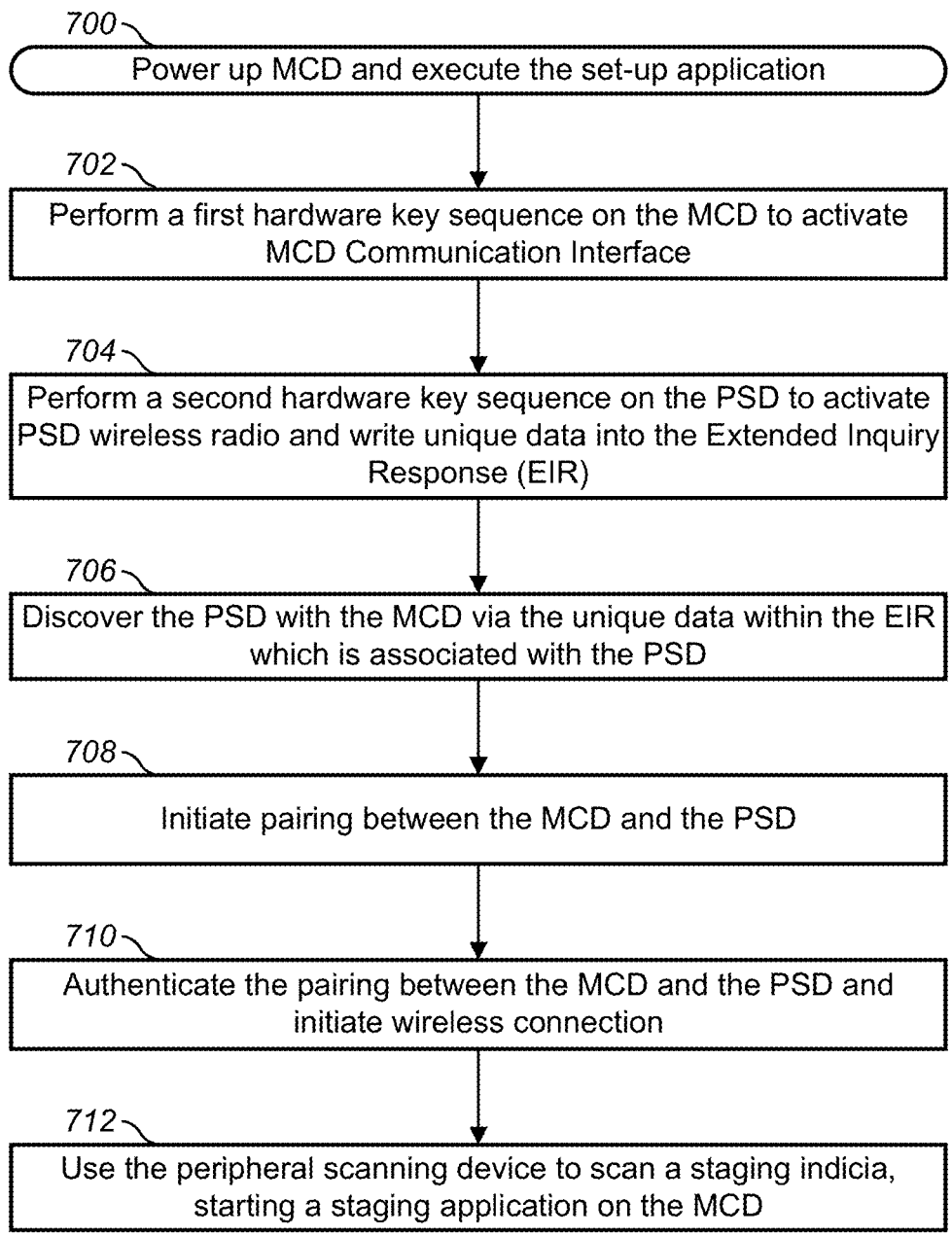
FIG. 7 is a flowchart of a second method for pairing an imager-less mobile computing device with a peripheral scanning device of FIG. 4.

FIG. 7 depicts an alternative method for pairing a MCD 102 with the PSD 104 for scanning staging indicia. The method as depicted in FIG. 7 can be used with the system 100 as shown in FIG. 1. At block 700, the MCD 102 is powered up and executes the setup application. As described above, once in the setup application, often times other functions of the MCD 102 are not available. The following method allows for the MCD 102 to pair with the PSD 104 while the MCD 102 is still operating in the setup application.

At block 702, the user performs a first hardware key sequence with the MCD 102 to activate the communication interface 204 of the MCD 102. The first hardware key sequence is any sequence of physical key presses on the MCD 102 that triggers the MCD 102 to begin the pairing process. In some embodiments, the first hardware key sequence is pressing a home button of the MCD 102 5 times. In another embodiment, the first hardware key sequence is pressing a volume up button on the MCD 102 5 times.

At block 704, the user performs a second hardware key sequence with the PSD 104 to activate the wireless radio 306 of the PSD 104. The second hardware key sequence is any sequence of physical key presses on the PSD 104 that triggers the PSD 104 to begin the pairing process. In some embodiments, the second hardware key sequence is pressing a home button of the PSD 104 5 times. In another embodiment, the second hardware key sequence is pulling a trigger of the PSD 104 5 times. After the PSD 104 activates the wireless radio 306, the PSD 104 writes unique data into the Extended Inquiry Response (EIR) of a PSD transmission. The activation of the wireless radio 306 may make the PSD 104 discoverable to other devices.

At block 706, the PSD 104 is discovered by the MCD 102 via the EIR data associated with the PSD 104 within the PSD transmission. The MCD 102 may recognize the EIR data as being secure based on data within the memory 202 of the MCD 102. This allows the MCD 102 to recognize the PSD 104 if the system 100 is in an environment that contains a plurality of other PSD with which the MCD 102 might be pairable. The MCD 102 may then be able to filter out other PSD transmissions until the EIR data is recognized from the PSD 104.

At block 708, after discovering the PSD 104 via the EIR data, the MCD 102 and the PSD 104 initiates the pairing process. At block 710, the MCD 102 and the PSD 104 authenticates the pairing and initiates the wireless connection.

At block 712, after the PSD 104 and the MCD 102 have connected, the user uses the PSD 104 to scan the staging indicia 108. Once the staging indicia is scanned, the PSD 104 transmits the staging data decoded from the staging indicia 108. The MCD 102 then uses the staging data to execute the staging application from within the setup application.

Figure 8:
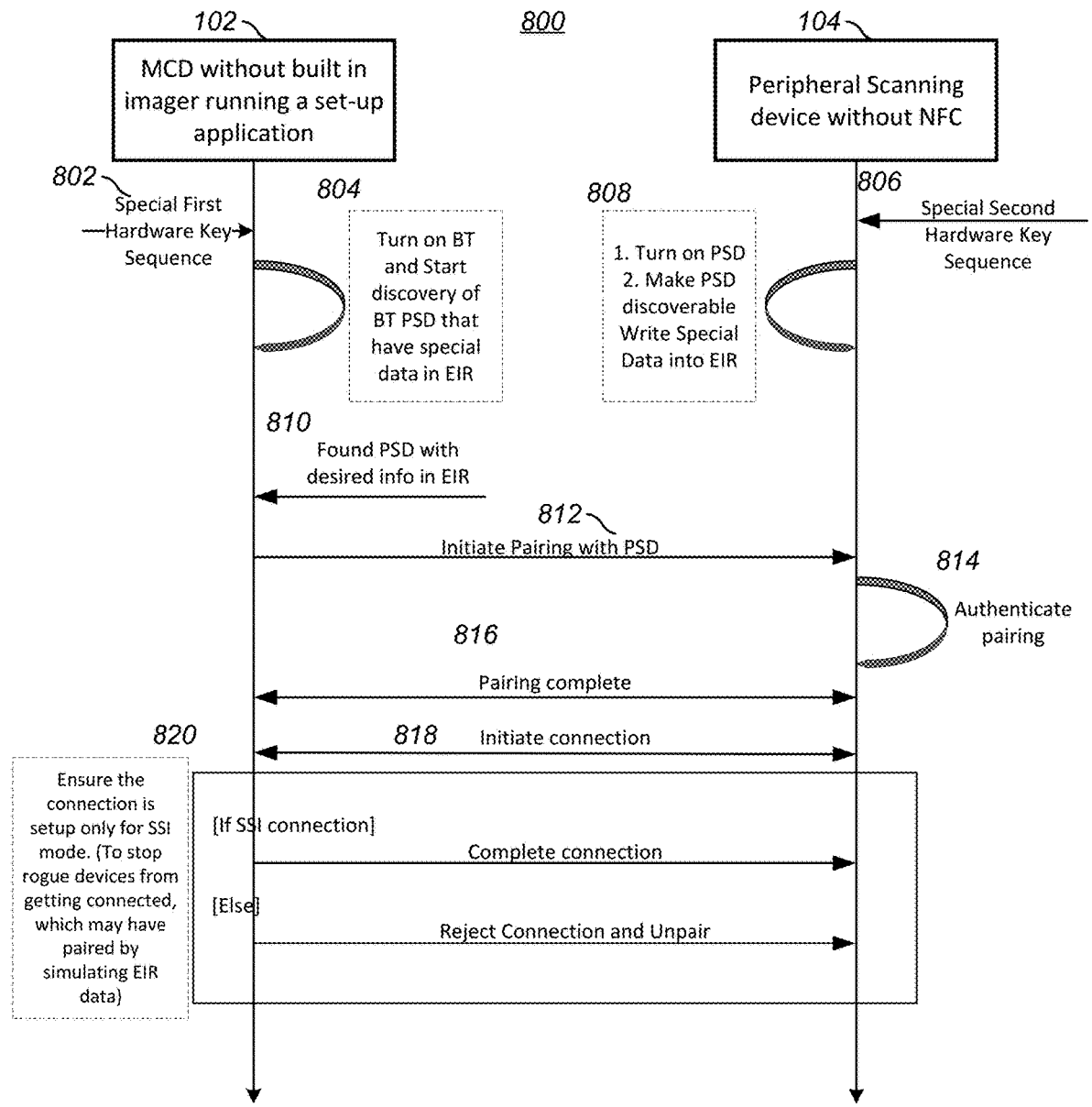
FIG. 8 is a sequence diagram showing the relationship of the imager-less mobile computing device and then peripheral scanning device during the method of FIG. 7.

FIG. 8 depicts a sequence diagram 800 of the method steps 700-710 depicted in FIG. 7. The sequence diagram 800 has the processes by the MCD 102 on the left-hand side and the processes by the PSD 104 on the right-hand side. The sequence diagram 800 begins with the MCD 102 having step 802 which requires a special first hardware key sequence to be input into the MCD 102. From the special key sequence, the MCD 102 moves to step 804 and turns on the Bluetooth radio of the MCD 102 and starts discovery of other wireless radios in an area around the MCD 102 that transmit the EIR.

Step 806 may require a second hardware key sequence to be input into the PSD 104. The second hardware key sequence may cause the PSD 104 to make the PSD discoverable by activating the wireless radio 306 to broadcast the EIR data. Step 810 displays pairing indicia with an encoded Bluetooth MAC address representative of the MCD 102. For step 812, the MCD 102, after discovering the PSD 104 based on the EIR data, initiates wireless pairing with the PSD 104.

For step 814, the PSD 104 authenticates the pairing with the MCD 102. The PSD 104 authenticates that the MCD 102 is proper for wireless pairing. After the authentication, at step 816, the MCD 102 and the PSD 104 each completes the pairing process and then initiates the wireless connection at step 818.

At step 820, the MCD 102 ensures that the connection is set up for SSI protocol only, as described above. If the SSI protocol is present, the connection is complete. If the SSI protocol is not present, the connection is rejection.

Figure 9:
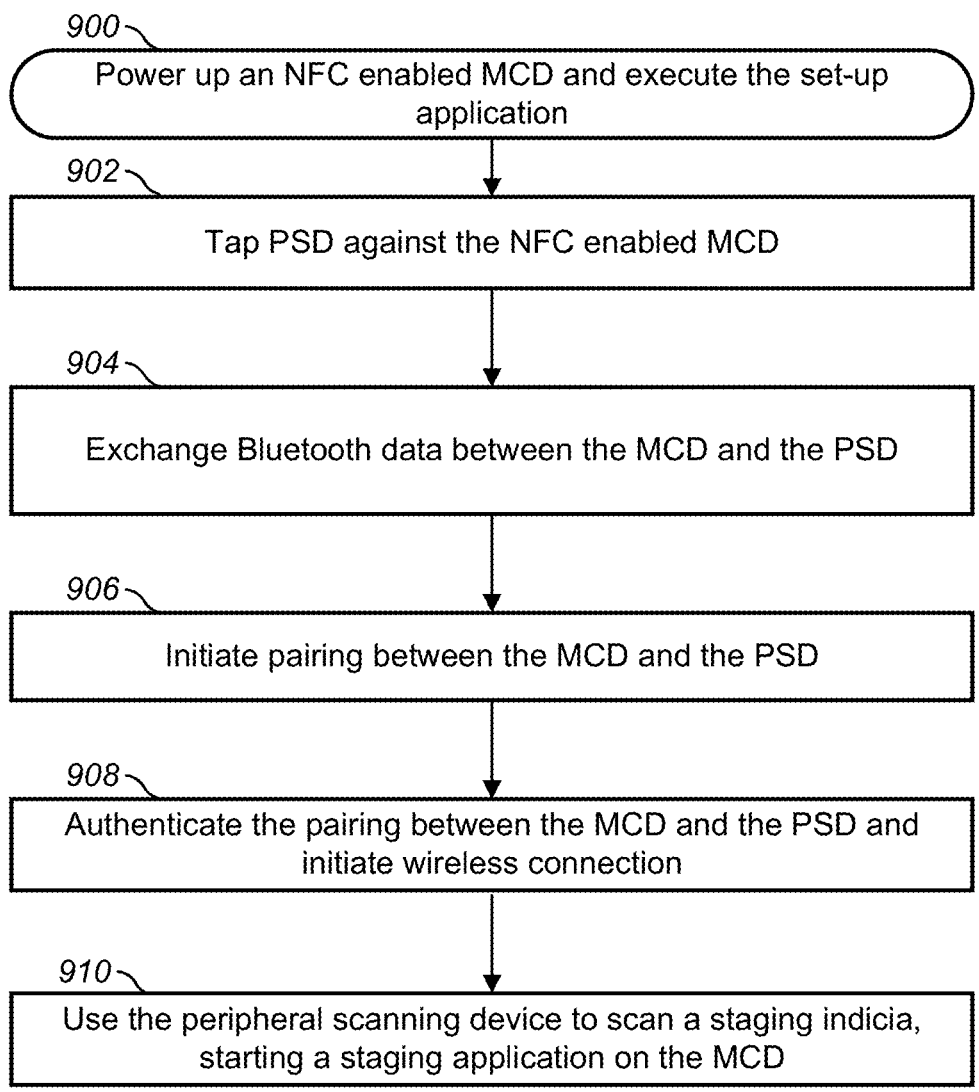
FIG. 9 is a flowchart of a third method for pairing an imager-less mobile computing device with a peripheral scanning device of FIG. 4.

FIG. 9 depicts an alternative method for pairing a MCD 102 with the PSD 104 for scanning staging indicia. The method of FIG. 9 can be used if the MCD 102 and the PSD 104 are configured for near-field communication (NFC), and if so, the method can be used with the system 100 as shown in FIG. 1. At block 900, the NFC enabled MCD 102 is powered up and executes the setup application. As described above, once in the setup application, often times other functions of the MCD 102 are not available. The following method allows for the MCD 102 to pair with the PSD 104 while the MCD 102 is still operating in the setup application.

At block 902, the NFC-enabled PSD 104 is tapped against the NFC-enabled MCD 102. The tapping of two NFC-enabled devices is a common way to activate pairing in the two devices, however any other known NFC activating pairing method could also be used.

At block 904, once the NFC activates pairing between the MCD 102 and the PSD 104, the devices exchange wireless communication data. This data may be Bluetooth data or any other exchange that would allow a wireless connection to be made.

At block 906, pairing is initiated between the MCD 102 and the PSD 104. At block 908, the pairing between the MCD 102 and the PSD 104 is authenticated and a wireless connection between the MCD 102 and the PSD 104 is initiated. Once the wireless connection between the MCD 102 and the PSD 104 is set, then data can be transmitted between the devices.

At block 910, after the PSD 104 and the MCD 102 have connected, the user uses the PSD 104 to scan the staging indicia 108. Once the staging indicia 108 is scanned, the PSD 104 transmits the staging data decoded from the staging indicia 108. The MCD 102 then uses the staging data to execute the staging application from within the setup application.

Figure 10:
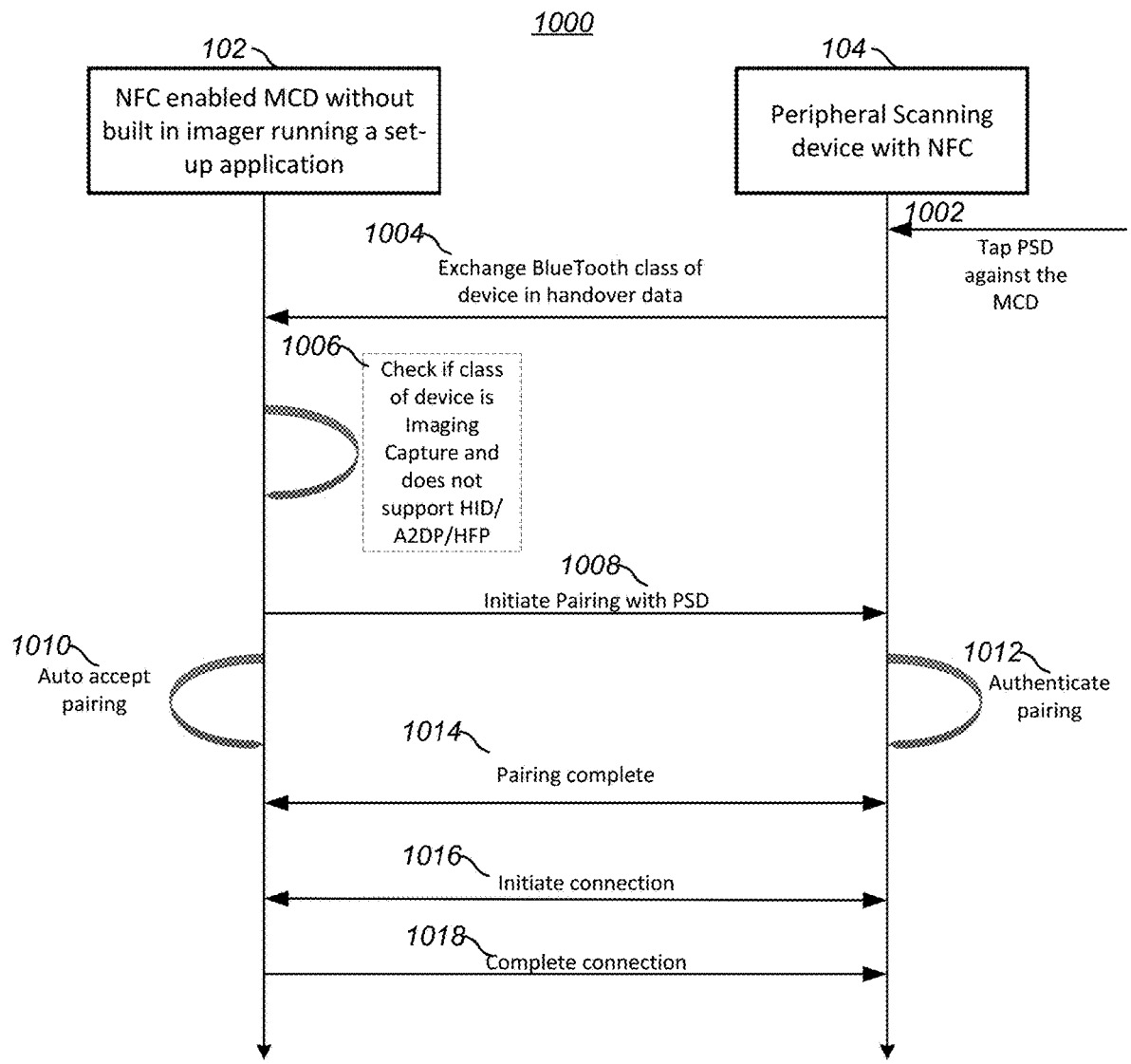
FIG. 10 is a sequence diagram showing the relationship of the imager-less mobile computing device and then peripheral scanning device during the method of FIG. 9.

FIG. 10 depicts a sequence diagram 1000 of the method steps 900-908 depicted in FIG. 9. The sequence diagram 1000 has the processes by the NFC-enabled MCD 102 on the left-hand side and the processes by the NFC-enabled PSD 104 on the right-hand side. The sequence diagram 1000 begins with the PSD 104 having step 1002 to tap the PSD 104 against the MCD 102.

Step 1004 allows for the PSD 104 to send Bluetooth information to the MCD 102 in an NFC exchange. This step does not need to necessarily be Bluetooth information, it can be any data transfer that allows for the wireless connection between the MCD and the PSD to occur. The Bluetooth information may be related to the class of device of the PSD 104.

Step 1006 may be done by the NFC-enabled MCD 102 as it checks the Bluetooth information received by the PSD 104 and whether the Bluetooth information is compatible with the MCD 102. If the MCD 102 determines that the PSD 104 is compatible based upon the Bluetooth information received, then the MCD 102 may move to step 1008 and initiate pairing with the PSD 104.

After pairing is initiated between the MCD 102 and the PSD 104, the MCD 102 takes step 1010 and automatically accepts the pairing initiation and PSD 104 takes step 1012 and authenticates pairing on its side. This process if further described above.

Once steps 1010 and 1012 are complete, then step 1014 occurs and pairing is complete. Step 1016 is to initiate a connection between the MCD 102 and the PSD 104. Then step 1018 has the connection to be complete.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of pairing a mobile computing device with an external device during set up of the mobile computing device, the method comprising, at a computing device:
   initiating a setup application on the mobile computing device;
   determining if the mobile computing device includes an internal scanner;
   when the mobile computing device does not include an internal scanner:
      preparing the mobile computing device for pairing with a peripheral scanning device;
      preparing the peripheral scanning device for pairing with the mobile computing device;
      pairing the mobile computing device with the peripheral scanning device; and
      scanning staging indicia with the peripheral scanning device to initiate a device staging application within the mobile computing device.

2. The method of claim 1, wherein the device staging application configures wireless settings within the mobile computing device.

3. The method of claim 1, wherein preparing the peripheral scanning device includes scanning a pairing indicia displayed by the mobile computing device.

4. A method of pairing a mobile computing device with a peripheral scanning device, the method comprising:
   initiating a setup application for the mobile computing device;
   receiving a touch configuration on a user interface of the mobile computing device;
   displaying a pairing indicia on the user interface, wherein the pairing indicia contains data corresponding to a Bluetooth MAC address of the mobile computing device;
   scanning the pairing indicia with the peripheral scanning device;
   in response to scanning the pairing indicia, using the Bluetooth MAC address of the mobile computing device to pair the mobile computer device with the peripheral scanning device;
   establishing a Bluetooth connection between the mobile computing device and the peripheral scanning device; and
   scanning a staging indicia with the peripheral scanning device to initiate a device staging application within the mobile computing device.

5. The method of claim 4, further comprising determining that the Bluetooth connection is a Synchronous Serial Interface (SSI) connection, and when the Bluetooth connection is not the SSI connection, terminating the Bluetooth connection.

6. The method of claim 4, wherein the device staging application terminates the Bluetooth connection.

7. The method of claim 4, wherein the device staging application configures wireless settings within the mobile computing device.

8. The method of claim 4, wherein the device staging application configures display settings within the mobile computing device.

9. A method of pairing a mobile computing device with a peripheral scanning device, the method comprising:
   initiating a setup application for the mobile computing device;
   inputting a first hardware key sequence on the mobile computing device to activate a first Bluetooth radio in the mobile computing device;
   inputting a second hardware key sequence on the peripheral scanning device to activate a second Bluetooth radio in the peripheral scanning device;
   writing data into an Extended Inquiry Response for Bluetooth transmission by the peripheral scanning device;
   discovering the peripheral scanning device with the mobile computing device via the data within the Extended Inquiry Response;
   initiating pairing between the mobile computing device and the peripheral scanning device;
   authenticating the pairing between the mobile computing device and the peripheral scanning device; and
   scanning a staging indicia with the peripheral scanning device to initiate a device staging application within the mobile computing device.

10. The method of claim 9, further comprising determining that the Bluetooth connection is a Synchronous Serial Interface (SSI) connection, and when the Bluetooth connection is not the SSI connection, terminating the Bluetooth connection.

11. A method of pairing a NFC enabled mobile computing device with a peripheral scanning device, the method comprising:
- initiating a setup application for the mobile computing device;
- tapping the peripheral scanning device against the mobile computing device;
- exchanging Bluetooth data between the mobile computing device and the peripheral scanning device;
- initiating pairing between the mobile computing device and the peripheral scanning device;
- authenticating the pairing between the mobile computing device and the peripheral scanning device; and
- scanning a staging indicia with the peripheral scanning device to initiate a device staging application within the mobile computing device.

12. The method of claim 11, further comprising further comprising determining that the Bluetooth connection is a Synchronous Serial Interface (SSI) connection, and when the Bluetooth connection is not the SSI connection, terminating the Bluetooth connection.

13. The method of claim 11, wherein the Bluetooth data is a class of device.

14. The method of claim 13, wherein the class of device is IMAGING_CAPTURE.

15. The method of claim 11, wherein when the device staging application is initiated, the pairing is disconnected.

16. A system for staging a mobile computing device, the system comprising:
- a mobile computing device; and
- a peripheral scanning device, wherein the system comprises:
  - initiating a setup application on the mobile computing device;
  - determining if the mobile computing device includes an internal scanner;
  - when the mobile computing device does not include an internal scanner:
    - preparing the mobile computing device for pairing with a peripheral scanning device;
    - preparing the peripheral scanning device for pairing with the mobile computing device;
    - pairing the mobile computing device with the peripheral scanning device; and
    - scanning staging indicia with the peripheral scanning device to initiate a device staging application within the mobile computing device.

17. The system of claim 16, wherein the device staging application configures wireless settings within the mobile computing device.

18. The system of claim 16, wherein preparing the peripheral scanning device includes scanning a pairing indicia displayed by the mobile computing device.

* * * * *